R. L. IVEY.
SHADE STREAK HACK.
APPLICATION FILED DEC. 22, 1911.
1,045,105.
Patented Nov. 19, 1912.
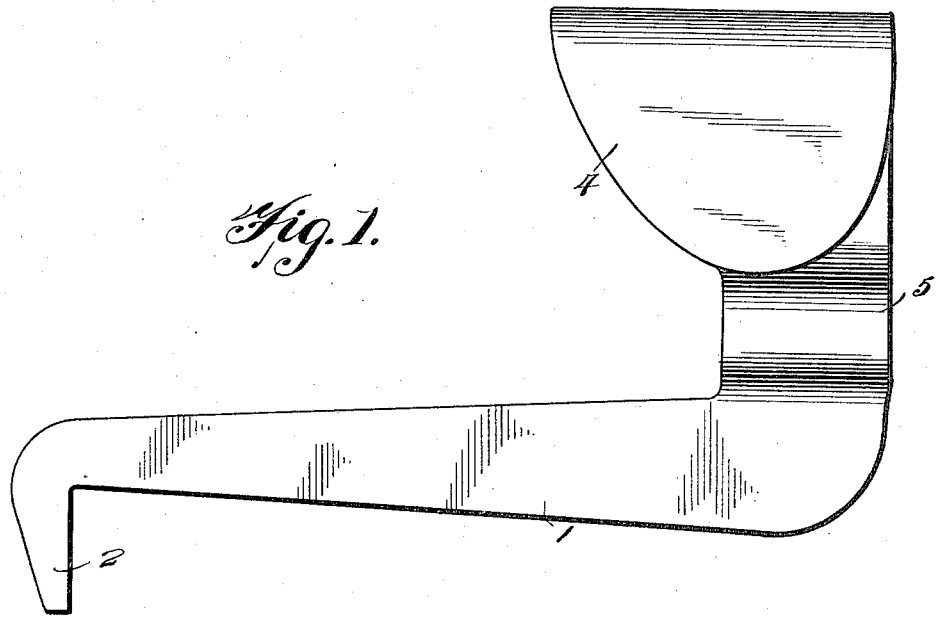
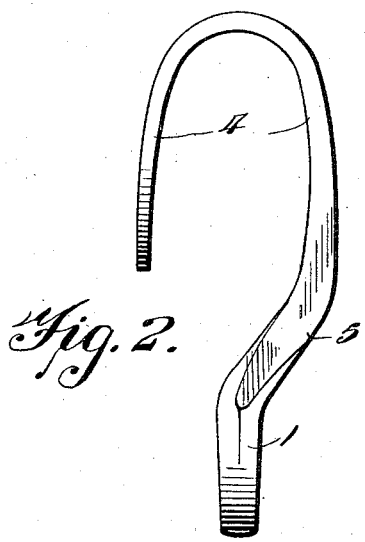
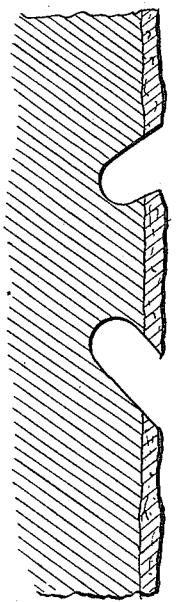
Inventor
R. L. Ivey.
Witnesses
Carroll Bailey
By Victor J. Evans
Attorney

UNITED STATES PATENT OFFICE.

ROMULUS L. IVEY, OF JACKSONVILLE, FLORIDA, ASSIGNOR TO THE CONSOLIDATED GROCERY CO., OF JACKSONVILLE, FLORIDA, A CORPORATION OF FLORIDA.

SHADE-STREAK HACK.

1,045,105. Specification of Letters Patent. Patented Nov. 19, 1912.

Application filed December 22, 1911. Serial No. 667,353.

*To all whom it may concern:*

Be it known that I, ROMULUS L. IVEY, a citizen of the United States, residing at Jacksonville, in the county of Duval and State of Florida, have invented new and useful Improvements in Shade - Streak Hacks, of which the following is a specification.

This invention relates to hackers and more particularly to that type of tool commonly known in the art as turpentine hackers, which tools are adapted to cut a streak in the tree from which the gum is obtained.

The object of the invention is to improve upon the present style of hacker now commonly used to cut what is known as the slab streak in the tree. These slab streaks are cut substantially at a right angle to the vertical plane of the tree and the new wood thus exposed is directly subjected to the rays of the sun. This dries up or closes the pores of the tree and consequently stops the sap from running.

It is the object of this invention to produce a device whereby these difficulties may be obviated and whereby what is known as a shade streak hack may be made. In explanation of the term, shade streak hack, it may be stated that this type of streak is cut upwardly at an obtuse angle to the plane of the tree in such a manner that the surface removed is shaded by the overhanging bark and wood. This type of cut not only insures a longer run of sap but also does not damage the tree nearly as much as the slab streak cut, thereby insuring its longevity.

In the accompanying drawings which form a part of this application Figure 1 is a side elevation of the tool. Fig. 2 is an end elevation thereof. Fig. 3 is a vertical section through the tree showing the difference between a slab streak cut and a shade streak cut, the latter being indicated below the former.

Referring more particularly to the drawing, 1 represents the shank of the tool which is tapered throughout its length and has its terminal end formed into the lateral extension 2 which is adapted to assist in securing the shank to the handle, not shown. The shank which is preferably formed of wrought iron has attached to the end thereof opposite from the lateral extension a blade or "bill" of the hack. This blade or "bill" is of usual formation substantially as shown in the patent to Watson, #327,207, but instead of having its flat portion alined with the shank as is customary, the flat portion is offset to one side of the shank so that a line drawn through the shank in the same direction parallel with the plane of the extension would intersect the "bill" in the center of the groove, as shown in Fig. 2. This offsetting of the "bill" or blade permits the tool to be operated at an obtuse angle to the side of the tree, whereas, if the "bill" was straight from the shank as of the type of tools now in general use, the handle would interfere unless the "bill" were held at substantially right angles to the tree, thus producing a slab streak. In other words, the blade or "bill" may engage the tree at the proper angle to produce a well formed shade streak cut, the offset throwing the handle sufficiently far enough away to change the angular relation of the "bill" with the tree. It has been clearly demonstrated that this style of cut is to be preferred in every instance to the slab streak cut which has to be made comparatively deep to secure the proper results, whereas the same results can be obtained with the shade streak cut by making a very light incision. The "bill" is shown at 4 and is connected to the shank by the offset connecting portion 5 which may either form a portion of the bill or a lateral extension of the shank. The shank and bill are preferably welded together but may be connected in any suitable manner.

What I claim as new is:—

1. A turpentine hacker comprising a shank, a curved bill, and a connection between the shank and bill which extends diagonally from the front of the shank and alines the center of the bill with the shank.

2. A turpentine hacker comprising a shank, a curved bill and a diagonal connection between the front of the shank and one side of the bill which extends diagonally from the front of the shank and alines the center of the bill with the shank.

3. A turpentine hacker comprising a shank, a curved cutting bill, and a diagonal connection between the front of the shank and one side of the bill which alines the center of the bill with the shank and provides space for the fingers between the cutting edge of the bill and shank.

4. A turpentine hacker comprising a shank, a curved cutting bill wider than the shank and having its cutter alined with the shank, and a right-angular extension on the shank of equal width therewith which connects the front of the shank with one side of the bill and provides finger space between the bill and the shank.

5. A turpentine hack comprising a shank, a substantially U-shaped bill having its center alined with the shank and a connection between the shank and the one leg of the bill which extends diagonally from the front of the shank on the one side only for providing a clearance for chips.

In testimony whereof I affix my signature in presence of two witnesses.

ROMULUS L. IVEY.

Witnesses:
 HARRY LEWIS,
 ELMO THAMES.

Copies of this patent may be obtained for five cents each, by addressing the "Commissioner of Patents, Washington, D. C."